(12) United States Patent
Price

(10) Patent No.: US 7,464,977 B1
(45) Date of Patent: Dec. 16, 2008

(54) ELEVATING LONG CARGO SUPPORT ASSEMBLY FOR PICKUP TRUCK

(76) Inventor: Brent A. Price, 1211 Bonfoy Ave., Colorado Springs, CO (US) 80909

( * ) Notice: Subject to any disclaimer, the term of this patent is extended or adjusted under 35 U.S.C. 154(b) by 0 days.

(21) Appl. No.: 12/077,104

(22) Filed: Mar. 17, 2008

Related U.S. Application Data

(60) Provisional application No. 60/895,218, filed on Mar. 16, 2007.

(51) Int. Cl.
*B60P 3/00* (2006.01)
(52) U.S. Cl. .................................. 296/3; 296/26.05
(58) Field of Classification Search ............... 296/3, 296/26.04, 26.05, 37.7, 37.5; 224/549, 557
See application file for complete search history.

(56) References Cited

U.S. PATENT DOCUMENTS

| 6,971,563 | B2* | 12/2005 | Levi | 296/3 |
| 2002/0125728 | A1* | 9/2002 | Chambers | 296/3 |
| 2007/0278810 | A1* | 12/2007 | Collins | 296/3 |
| 2008/0100075 | A1* | 5/2008 | Derecktor | 296/3 |

* cited by examiner

*Primary Examiner*—Lori L Lyjak
(74) *Attorney, Agent, or Firm*—G. F. Gallinger

(57) ABSTRACT

An elevating cargo support assembly configured to extend across and between a top portion of the two opposite sidewalls of the bed on a pickup truck comprising: i) a central cargo support member having a track extending along its lower side portion between its opposite end portions; ii) two slides positioned within, and carried by the track; iii) two pivoting arms, each having an inner end portion hingably and slidably attached to a different one of the slides in the track extending along the cargo support member, and each having an outer end portion hingably carried by the top portion of one of the sides of the bed on the pickup truck; and, iv) releasable slide lock to releasably lock each of the slides and a corresponding one of the pivoting arms in an opposite end portion of the central cargo support member to thereby maintain the central cargo support member in an elevated position. Whereby when in a lower position, the pivoting arms extend generally horizontally together, the inner end portion of each pivoting arm being hingably attached to one of the slides, slidably positioned within a central portion of the track; and when in the elevated position the pivoting arms each extend upwardly, the inner end portion of each pivoting arm being hingably attached to one of the slides, lockably positioned within an outer portion of the track, so that long cargo may then be supported on the central cargo support member.

17 Claims, 3 Drawing Sheets

ELEVATING LONG CARGO SUPPORT ASSEMBLY FOR PICKUP TRUCK

PRIOR APPLICATION

This application claims the priority of U.S. Provisional Patent Application No. 60/895,218 filed Mar. 16, 2007.

FIELD OF THE INVENTION

This invention relates to long cargo racks used in the bed of pickup trucks. More particularly this invention relates to an elevating cargo support assembly which extends laterally across the bed of the pickup truck. The cargo support assembly elevates from a lower position generally aligned with the top of the truck's box to an upper position marginally above the truck's cab, so that ladders, canoes, and other paraphernalia exceeding the box length may be conveniently carried thereon.

BACKGROUND OF THE INVENTION

Within this specification long cargo is defined to be cargo having a length substantially exceeding the bed on a pickup truck. It is difficult to carry long cargo on a pickup truck without using a rack, which enables the long cargo, when loaded, to extend over the cab of the truck. Most individuals only need to carry long cargo such as a canoe or a ladder, infrequently. An unused rack which projects above the truck is generally considered detrimental in appearance. Yet when the rack is needed convenience is demanded. One of the solutions to this problem is a rack which can be raised from a storage position within the bed of the truck. However, this solution is complicated by the fact that the height above the truck to which the rack must be raised, generally exceeds the depth of the box in the truck. Additionally, storage of a bulky rack in the truck box is generally space consuming, and substantially limits available capacity therein.

This invention discloses an elevating cargo support assembly which due to a unique mechanism, may be raised from a storage position which is generally level with a top side portion of the bed box. In the storage position the elevating cargo support assembly generally does not project above the bed box; it is generally not visible. Neither does the elevating cargo support assembly obstruct the space within the bed box while in the storage position. Due to its inherent design the rack assembly universally fits trucks having varying widths of bed boxes. It may be conveniently shifted between its storage and in-use position.

OBJECTS OF THE INVENTION

It is an object of this invention to disclose a long cargo support assembly for a pickup truck which may raise from a storage position to an elevated position in which it is used to carry long cargo. It is an object of this invention to disclose a long cargo support assembly which does not obstruct the capacity of the bed box when it is lowered to a storage position. It is an object of this invention to disclose a long cargo support assembly which is generally not visible when it is lowered to a storage position. It is yet a further object of this invention to disclose a long cargo support assembly which may be conveniently moved between a storage position and an elevated in-use position. It is yet a further object of this invention to disclose a long cargo support assembly which may be affixed to a leased truck without in any way defacing the truck. It is yet a further object of this invention to disclose a long cargo support assembly which accommodates varying bed widths and which may be attached directly to all pickup trucks with either one of two brackets. It is a final object of this invention to disclose a rack assembly for a pickup truck which facilitates direct attachment of the long cargo support assembly directly to the rack assembly. The long cargo support assembly and the disclosed rack assembly can be combined in a distinctive and unified complementary appearance on any model or color of a pickup truck.

One aspect of this invention provides for an elevating cargo support assembly configured to extend across and between a top portion of the two opposite sidewalls of the bed on a pickup truck comprising: i) a central cargo support member having a track extending along its lower side portion between its opposite end portions; ii) two slides positioned within, and carried by the track; iii) two pivoting arms, each having an inner end portion hingably and slidably attached to a different one of the slides in the track extending along the cargo support member, and each having an outer end portion hingably carried by the top portion of one of the sides of the bed on the pickup truck; and, iv) releasable slide lock means to releasably lock each of the slides and a corresponding one of the pivoting arms in an opposite end portion of the central cargo support member to thereby maintain the central cargo support member in an elevated position. Whereby when in a lower position, the pivoting arms extend generally horizontally together, the inner end portion of each pivoting arm being hingably attached to one of the slides, slidably positioned within a central portion of the track; and when in the elevated position the pivoting arms each extend upwardly, the inner end portion of each pivoting arm being hingably attached to one of the slides, lockably positioned within an outer portion of the track, so that long cargo may then be supported on the central cargo support member.

In a preferred aspect of this invention the central cargo support member is extruded and the track comprises a longitudinal opening extending through a lower side portion thereof having a slot extending through a bottom side portion thereof, wherein the opening has a width exceeding the width of the slot, and wherein the track carries the slide positioned therein, said slide having a flange extending through the slot.

Various other objects, advantages and features of this invention will become apparent to those skilled in the art from the following description in conjunction with the accompanying drawings.

FIGURES OF THE INVENTION

Figure 1:
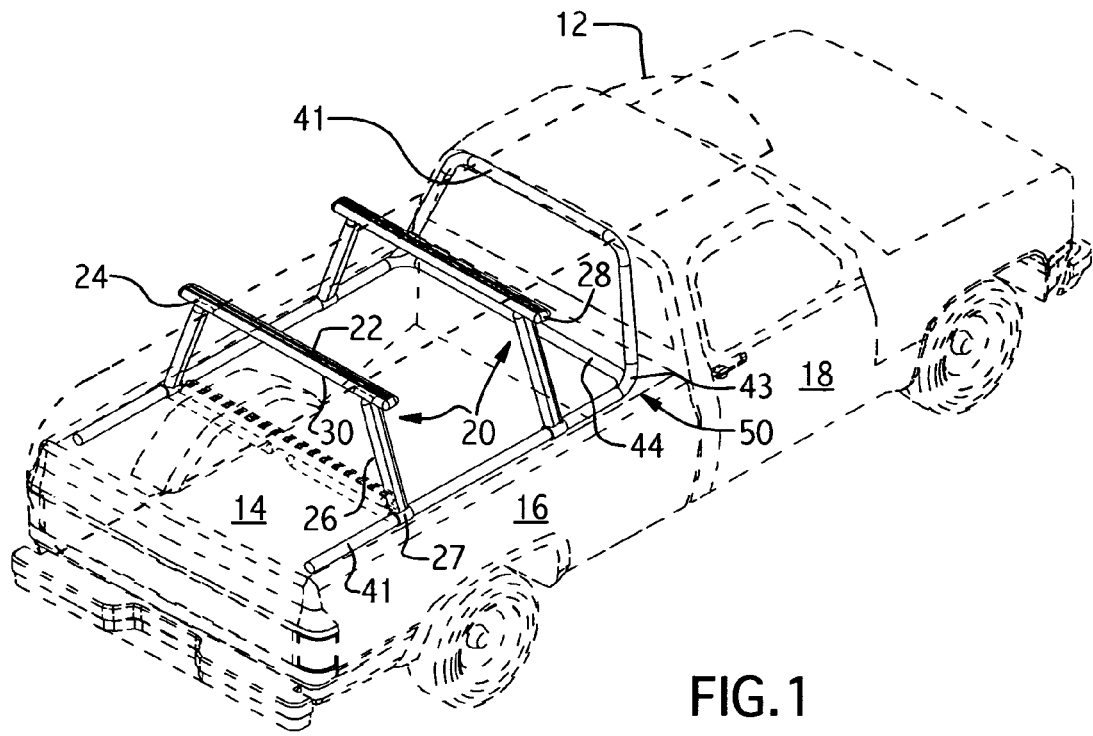
FIG. 1 is a perspective view of an elevating long cargo support assembly pivotably attached to a tubular rack assembly on a pickup truck.

The following is a discussion and description of the preferred specific embodiments of this invention, such being made with reference to the drawings, wherein the same reference numerals are used to indicate the same or similar parts and/or structure. It should be noted that such discussion and description is not meant to unduly limit the scope of the invention.

DESCRIPTION OF THE INVENTION

Turning now to the drawings and more particularly to FIG. 1 we have a perspective view of an elevating long cargo support assembly 20 pivotably attached to a tubular rack assembly 50 on a pickup truck 18. Most generally, an elevating cargo support assembly 20 configured to extend across and between a top portion of the two opposite sidewalls 16 of the bed 14 on a pickup truck 18 comprises: i) a central cargo support member 22 having a track extending along its lower side portion between its opposite end portions; ii) two slides 24 positioned within, and carried by the track 30; iii) two pivoting arms 26, each having an inner end portion hingably and slidably attached to a different one of the slides 24 in the track 30 extending along the cargo support member 22, and each having an outer end portion hingably carried by the top portion of one of the sides 16 of the bed 14 on the pickup truck 18; and, iv) releasable slide lock means 28 to releasably lock each of the slides 24 and a corresponding one of the pivoting arms 26 in an opposite end portion of the central cargo support member 22 to thereby maintain the central cargo support member 22 in an elevated position. Whereby when in a lower position, the pivoting arms 26 extend generally horizontally together, the inner end portion of each pivoting arm 26 being hingably attached to one of the slides 26, slidably positioned within a central portion of the track 30; and when in the elevated position the pivoting arms 26 each extend upwardly, the inner end portion of each pivoting arm 26 being hingably attached to one of the slides 24, lockably positioned within an outer portion of the track, so that long cargo 12 may then be supported on the central cargo support member 22.

In FIG. 1, the rear cargo support assembly 20 is shown in ghost in a down storage position. It is noted that the central cargo support member 22 in the lower position has utility to carry shorter cargo. Rack adapters (not shown) are generally available to carry skiis, bicycles, and kayaks on a planar member such as the central cargo support member 20.

Figure 2:
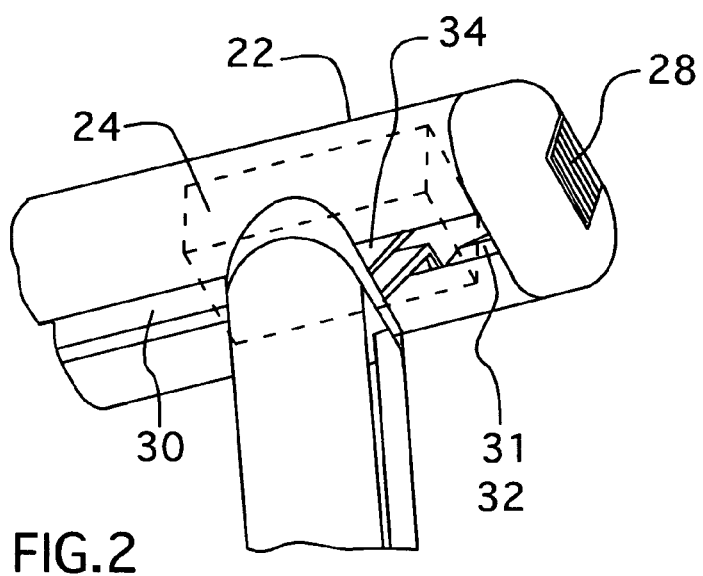
FIG. 2 is an enlarged partial perspective view of the elevating cargo support assembly shown in FIG. 1.

FIG. 2 is an enlarged partial perspective view of the elevating cargo support assembly 20 shown in FIG. 1. Most preferably, the central cargo support member 22 is extruded and the track 30 comprises a longitudinal opening 31 extending through a lower side portion thereof having a slot 32 therealong a bottom side portion thereof, wherein the opening has a width exceeding the width of the slot 32, and wherein the track 30 carries the slide 24 positioned in the track 30, having a flange 34 extending through the slot 32.

Figures 3A, 3B:
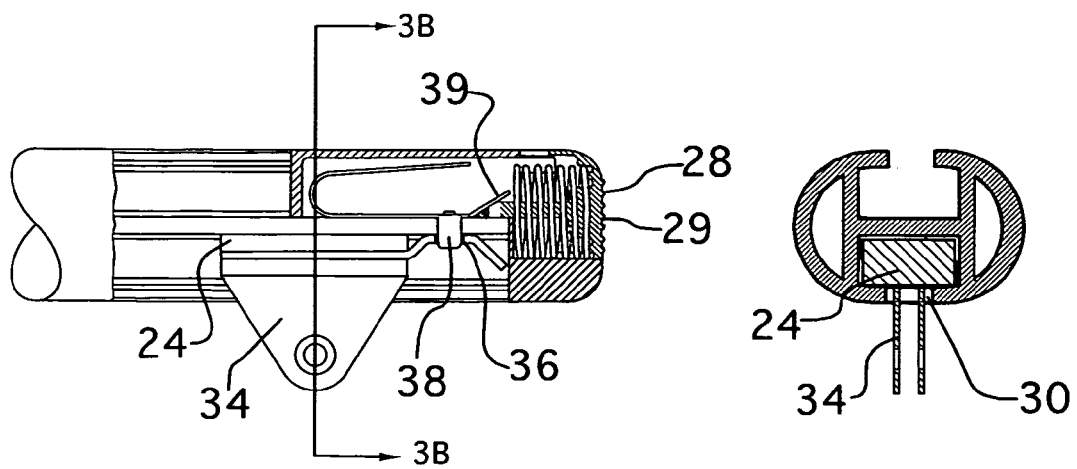
FIG. 3A is a cross sectional view of the end portion of the central cargo support member shown in FIG. 2.
FIG. 3B is a cross sectional view taken along line 3B-3B in FIG. 3A.

FIG. 3A is a cross sectional view of the end portion of the central cargo support member shown in FIG. 2. FIG. 3B is a cross sectional view taken along line 3B-3B in FIG. 3A. The releasable locking means 28 comprises a hole 36 in the slide 24, and a push button 38 releasably engaging the hole 36. The releasable locking means 28 is configured to automatically lock only when the central cargo support member 22 is in an upper position. The push button 38 is biased 39 to an engaged position. The push button 38 may be conveniently disengaged from a side 16 of the bed 14 by pressing a button 29 on the outer end portion of the central cargo support member 22.

FIG. 1 shows the long cargo support assembly attached to a rack assembly 50 which is in turn attached to the truck 18. Alternatively, the outer end portion of each of the two pivoting arms 26 of the elevating cargo support assembly 20 can be pivotably bolted to the upper interior corner portion of a bracket 40 which is directly attached to the interior and the upper portion of the sidewall 16 of the pickup truck bed 14.

Figures 4A, 4B:
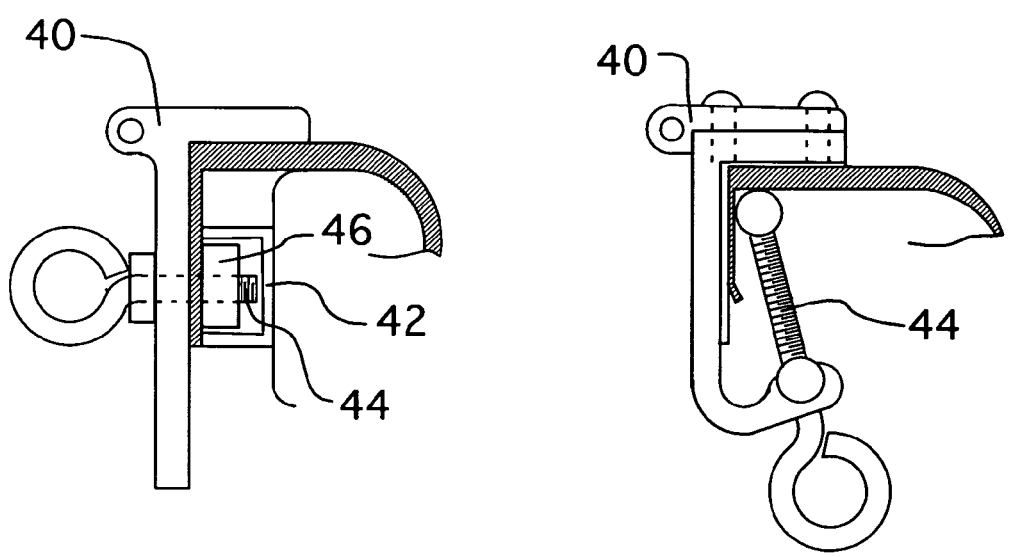
FIG. 4A is a cross sectional view of a bracket used to attach the pivoting arm of the assembly to an upper portion of the bed sidewall of a truck having a tie-down channel.
FIG. 4B is a cross sectional view of a bracket used to attach the pivoting arm of the assembly to an upper portion of the bed sidewall of a truck not having a tie-down channel.

FIG. 4A is a cross sectional view of a bracket 40 used to attach the pivoting arm 26 of the assembly 20 to an upper portion of the bed sidewall 16 of a truck 18 having a tie-down channel 42. The bracket 40 is attached to the tie-down channel 42 using a screw 44 extending through a side portion of the bracket 40 into a nut 46 within the tie-down channel 42. FIG. 4B is a cross sectional view of a bracket 40 used to attach the pivoting arm 26 of the assembly 20 to an upper portion of the bed sidewall 16 of a truck 18 not having a tie-down channel 42. This bracket 40 is more fully disclosed in U.S. Pat. No. 6,604,898 for a Vehicular Cargo Anchor, issued to the inventor herein, Brent A. Price on Aug. 12, 2003. Herein, the attachment bracket 40 comprises a screw 44 turned from a lower interior portion of the bracket 40 into an upper interior corner between the top portion and the turned down portion of the bed sidewall 16.

Referring back to FIG. 1 the elevating cargo support assembly 20 therein further comprises a truck rack assembly 50 of longitudinal tubular members carried along top portions of the opposite sides 16 of the bed 14, and wherein the outer end portion of the pivoting arms 26 comprises a sleeve 27 which fits closely over the tubular members 41. Most preferably the truck rack assembly 50 further comprises front corners 43 and a lateral tubular member 44 extending therebetween to generally unify and thereby strengthen the mounting of the longitudinal members 41. In a preferred embodiment the truck rack assembly 50 further comprises tubular members 41 extending up from the front corners 43 and around the rear cab window of the truck 18.

Figure 5A:
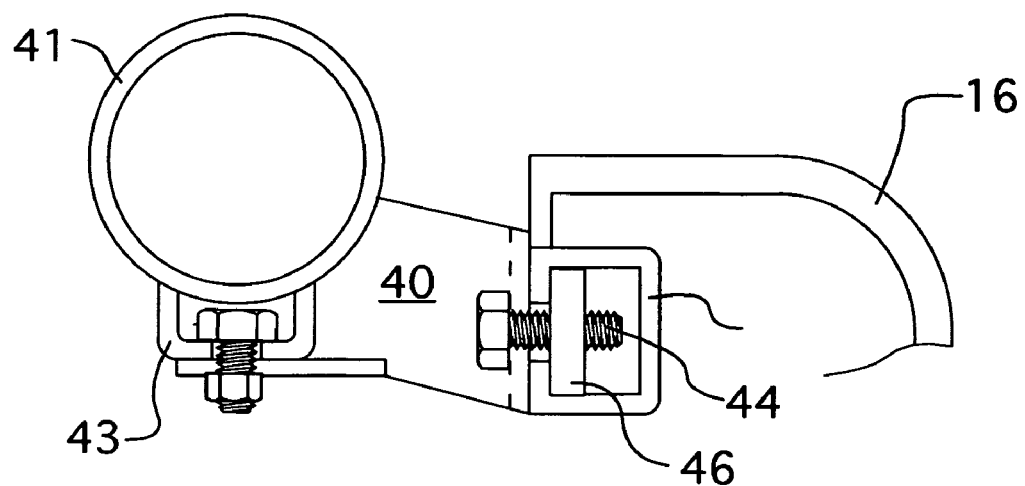
FIG. 5A is a cross sectional view of a bracket used to attach the tubular rack assembly shown in FIG. 1 to an upper portion of the bed sidewall of a truck having a tie-down channel.

FIG. 5A is a cross sectional view of a bracket used to attach the tubular rack assembly shown in FIG. 1 to an upper portion of the bed sidewall of a truck having a tie-down channel. When the sides of the truck 16 of the bed 14 have an interior tie-down channel 42 then a lower side portion of the longitudinal members 41 are bolted to a bracket 40 having an outer side portion which is bolted to the tie-down channel 42. In the configuration shown in FIG. 5A the bottom side portion of the longitudinal members 41 further comprises a U shaped attachment 43 to facilitate bolting the longitudinal member 41 to the bracket 40.

Figure 5B:
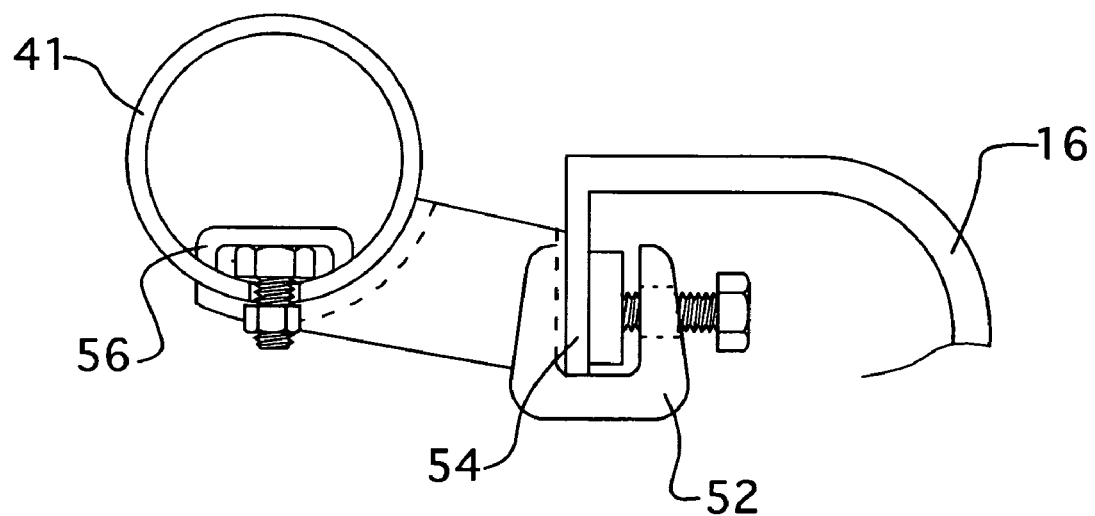
FIG. 5B is a cross sectional view of a bracket used to attach the tubular rack shown in FIG. 1 to an upper portion of the bed sidewall of a truck not having a tie-down channel.

FIG. 5B is a cross sectional view of a bracket 40 used to attach the tubular rack assembly 50 shown in FIG. 1 to an upper portion of the bed sidewall of a truck not having a tie-down channel. When the sides 16 of the truck bed 14 lack an interior tie-down channel 42 then a lower side portion of the longitudinal members 41 are bolted to a bracket 40 having an outer side portion which utilizes a C clamp 52 to attach to the interior turned down portion 54 of the bed side wall 16. In the configuration shown in FIG. 5B the longitudinal members 41 are extruded and comprise therein a lower channel 56 to facilitate bolting the longitudinal member 41 to the bracket 40.

While the invention has been described with preferred specific embodiments thereof, it will be understood that this description is intended to illustrate and not to limit the scope of the invention, which is defined by the following claims.

I claim:

1. An elevating cargo support assembly configured to extend across and between a top portion of the two opposite sidewalls of the bed on a pickup truck comprising:
   i) a central cargo support member having a track extending along its lower side portion between its opposite end portions;
   ii) two slides positioned within, and carried by the track;
   iii) two pivoting arms, each having an inner end portion hingably and slidably attached to a different one of the slides in the track extending along the cargo support member, and each having an outer end portion hingably carried by the top portion of one of the sides of the bed on the pickup truck; and,
   iv) releasable slide lock means to releasably lock each of the slides and a corresponding one of the pivoting arms in an opposite end portion of the central cargo support member to thereby maintain the central cargo support member in an elevated position;
   whereby when in a lower position, the pivoting arms extend generally horizontally together, the inner end portion of each pivoting arm being hingably attached to one of the slides, slidably positioned within a central portion of the track; and when in the elevated position the pivoting arms each extend upwardly, the inner end portion of each pivoting arm being hingably attached to one of the slides, lockably positioned within an outer portion of the track, so that long cargo may then be supported on the central cargo support member.

2. An elevating cargo support assembly as in claim 1 wherein the central cargo support member is extruded and the track comprises a longitudinal opening extending through a lower side portion thereof having a slot extending through a bottom side portion thereof, wherein the opening has a width exceeding the width of the slot, and wherein the track carries the slide positioned therein, said slide having a flange extending through the slot.

3. An elevating cargo support assembly as in claim 2 wherein the releasable locking means comprises a hole in the slide, and a push button releasably engaging the hole.

4. An elevating cargo support assembly as in claim 3 wherein the releasable locking means is configured to automatically lock only when the central cargo support member is in an upper position.

5. An elevating cargo support assembly as in claim 4 wherein the push button is biased to an engaged position and wherein the push button may be conveniently disengaged from a side of the bed by pressing a button on the outer end portion of the central cargo support member.

6. An elevating cargo support assembly as in claim 1 wherein the outer end portion of each of the two pivoting arms of the elevating cargo support assembly is pivotably bolted to the upper interior corner portion of a bracket which is directly attached to the interior and the upper portion of the sidewall of the pickup truck bed.

7. An elevating cargo support assembly as in claim 6 wherein the sides of the truck bed have an interior tie-down channel and wherein the bracket is attached to the tie-down channel using a screw extending through a side portion of the bracket into a nut within the tie-down channel.

8. An elevating cargo support assembly as in claim 6 wherein the sides of the truck bed lack an interior tie-down channel and wherein the attachment bracket comprises a screw turned from a lower interior portion of the bracket into an upper interior corner between the top portion and the turned down portion of the bed sidewall.

9. An elevating cargo support assembly as in claim 1 further comprising a truck rack having longitudinal tubular members carried along top portions of the opposite sides of the bed, and wherein the outer end portion of the pivoting arms comprises a sleeve which fits closely over the tubular members.

10. An elevating cargo support assembly as in claim 9 wherein the truck rack further comprises front corners and a lateral tubular member extending therebetween to generally unify and thereby strengthen the mounting of the longitudinal members.

11. An elevating cargo support assembly as in claim 10 wherein the truck rack further comprises tubular members extending up from the front corners and around the rear cab window of the truck.

12. An elevating cargo support assembly as in claim 6 wherein the sides of the truck bed have an interior tie-down channel and wherein a lower side portion of the longitudinal members are bolted to a bracket having an outer side portion which is bolted to the tie-down channel.

13. An elevating cargo support assembly as in claim 12 wherein the bottom side portion of the longitudinal members further comprises a U shaped attachment to facilitate bolting the longitudinal member to the bracket.

14. An elevating cargo support assembly as in claim 12 wherein the longitudinal members are extruded and wherein the extrusion further comprises a lower channel to facilitate bolting the longitudinal member to the bracket.

15. An elevating cargo support assembly as in claim 6 wherein the sides of the truck bed lack an interior tie-down channel and wherein a lower side portion of the longitudinal members are bolted to a bracket having an outer side portion which utilizes a C clamp to attach to the interior turned down portion of the bed side wall.

16. An elevating cargo support assembly as in claim 15 wherein the bottom side portion of the longitudinal members further comprises a U shaped attachment to facilitate bolting the longitudinal member to the bracket.

17. An elevating cargo support assembly as in claim 15 wherein the longitudinal members are extruded and wherein the extrusion comprises a lower channel to facilitate bolting the longitudinal member to the bracket.

* * * * *